United States Patent [19]

Sasaki

[11] Patent Number: 5,252,072

[45] Date of Patent: Oct. 12, 1993

[54] BONSAI PLANT TRAINING METHOD AND APPARATUS

[76] Inventor: Harold Sasaki, 12355 W. 34th Pl., Wheat Ridge, Colo. 80033

[21] Appl. No.: 991,744

[22] Filed: Dec. 17, 1992

[51] Int. Cl.⁵ .............................................. A01B 79/00
[52] U.S. Cl. .................................... 434/81; 248/156; 47/58
[58] Field of Search ............. 47/4, 45 R, 45 C, 47 R, 47/47 L, 58 R, 58 T; 248/156; 182/206, 197, 198; 434/81

[56] References Cited

U.S. PATENT DOCUMENTS

| | | | |
|---|---|---|---|
| 466,816 | 1/1892 | Wilson | 182/108 |
| 2,223,980 | 12/1940 | Zent | 182/197 |
| 2,557,731 | 6/1951 | Felsing | 47/47 |
| 3,004,366 | 10/1961 | Jaspert | 47/47 |
| 3,142,935 | 8/1964 | Campos | 47/47 R |
| 4,026,068 | 5/1977 | Tepper | 47/45 |
| 4,231,449 | 11/1980 | Laurita | 182/196 X |
| 4,333,264 | 6/1982 | Smrt | 47/42 |
| 4,881,342 | 11/1989 | Ferguson | 47/47 |
| 4,993,184 | 2/1991 | Howe | 47/4 |

FOREIGN PATENT DOCUMENTS

| | | | |
|---|---|---|---|
| 2801004 | 7/1978 | Fed. Rep. of Germany | 47/47 |
| 543803 | 11/1921 | France | 47/44 |
| 680147 | 4/1930 | France | . |
| 1467865 | 12/1965 | France | 47/47 |
| 331425 | 1/1955 | Switzerland | 47/47 L |
| 662471 | 12/1978 | Switzerland | 47/47 L |
| 632325 | 11/1978 | U.S.S.R. | . |
| 719968 | 12/1954 | United Kingdom | 47/44 |
| WO89/07391 | 8/1989 | World Int. Prop. O. | . |

*Primary Examiner*—Gene Mancene
*Assistant Examiner*—Thomas L.
*Attorney, Agent, or Firm*—Beaton & Swanson

[57] ABSTRACT

A bonsai plant training method and apparatus includes a ladder-like support structure having fixed pegs and movable hooks for training a bonsai plant. The support is placed next to a plant that is to be trained and the plant is arranged on the pegs and hooks, establishing the zigzag or other desired shape. After the plant has grown into the desired shape, the support is removed.

18 Claims, 2 Drawing Sheets

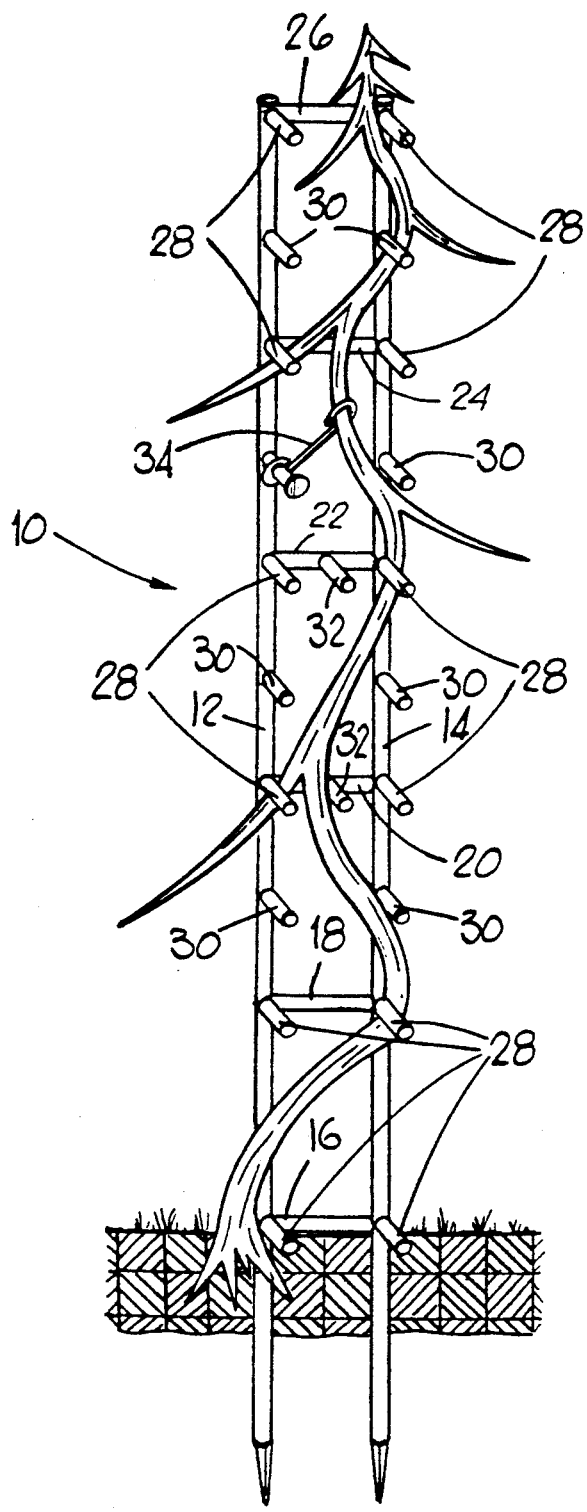
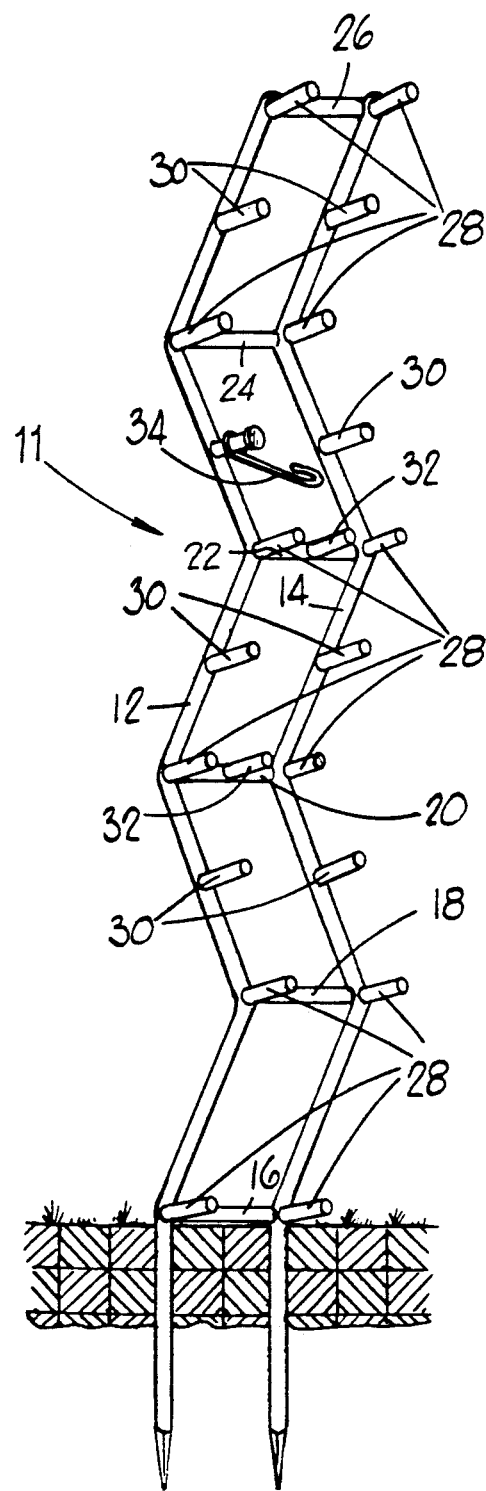
FIG. 1
FIG. 2

BONSAI PLANT TRAINING METHOD AND APPARATUS

FIELD OF THE INVENTION

This invention relates to bonsai plants, and more particularly to a method and apparatus for training a bonsai plant that includes a ladder-like training structure having fixed pegs and movable hooks for shaping and holding the stem of the plant. The training structure is placed next to a plant that is to be trained and the plant is arranged on the pegs and hooks, establishing the characteristic zigzag shape that is desired in a bonsai plant. After the plant has grown into the desired shape, the training structure is removed.

The method and apparatus of this invention dramatically reverse the time and labor-intensive nature of bonsai plant training as presently practiced, and open the field to persons who are not highly skilled artisans. The invention has particular utility for use in large scale nursery operations where hundreds or thousands of plants might be involved. The invention also has the promise of opening the field more widely to hobbyists who might, with the aid of this invention, be able to cultivate and train bonsai plants without first becoming highly trained in the art.

BACKGROUND OF THE INVENTION

Bonsai ("tray-planted") trees are living dwarf trees, and "bonsai" refers both to the trees themselves and to the art of training and growing them. A bonsai tree originates as an ordinary tree or shrub that is dwarfed by a system of pruning and training. The roots may be, and the branches usually are pruned; and the branches are conventionally trained by wrapping them in aluminum or copper wire and bending the wire-wrapped plant into the desired shape.

The inspiration for bonsai is the dwarfed and gnarled trees that grow in rocky crevices of high mountains or cliffs. The desirable bonsai specimen is a plant that is made to mimic the dwarf plants naturally occurring. Among the desired traits are an aged appearance of the trunk and branches and a weathered character in the exposed upper roots. Aesthetic considerations include relatively small leaves or short needles, small flowers and fruit, open space between the branches, open space between clusters of foliage, and bare lower trunks. These aesthetic qualities are said to reflect the idea of mutability in physical things. Bonsai plants range from 2 inches, up to about 4 feet in height.

The art of bonsai probably originated in China over 1,000 years ago, and thereafter has been pursued and developed by Japanese artisans. Japanese bonsai plants are shown as long ago as 1309, in the Kasuga-gongen-genki, a picture scroll by Takashina Takakane. In current times, a bonsai industry of considerable size exists as part of the nursery business in Japan, and the technique is pursued also in the United States and elsewhere.

Traditional bonsai training techniques are based on wrapping a young plant to train it and its branches to assume a new position, leaving the wraps on for one or more growing seasons, and removing the wraps afterwards. The wrap presently used is most often a steel, aluminum or copper wire. The wire is coiled around the stem of the plant and then a skilled artisan makes the appropriate bends. After leaving the wire in place for six to twelve months, the wire is removed by uncoiling or by cutting the wire into small pieces.

To be completely certain of the plant's progress, the wire must be checked, as often as weekly, and loosened from time to time. If the wire is not loosened, the stem could grow into the wire and the plant will be scarred. These scars destroy the naturalistic look of the plant and substantially reduce the commercial and aesthetic value of the finished product. If the wire is left on the plant too long, the plant will be scarred, but if the wire is removed too soon, the trunk will revert to its original shape and would require rewiring.

The traditional technique is time and labor intensive. In the first instance, each plant must be painstakingly wrapped and bent. In a large scale setting, this is extremely time consuming. Moreover, because the plants must be checked, as often as once a week to prevent scarring, it is difficult to use the traditional method in any large scale nursery operation where hundreds or thousands of plants might be involved. In such a setting, there are simply too many plants to check and recheck so as to monitor and prevent the growth of the stem into the wire by loosening and resetting the wires as necessary. A substantial number of wasted plants or lower value "seconds" is the result of a large scale nursery operation conducted according to the traditional wire-tied technique.

In addition, the traditional technique requires the employment of highly skilled artisans. An artisan applies the wire wrap to the young plant and makes the appropriate bends. The aesthetic value of the bonsai is dependent upon a generally zigzag series of side to side bends to the stem, with the bends being proportioned in size and spacing. At the same time, the branches are set at appropriate intervals and orientation from the stem. An additional dimension is added by a further zigzag series of front to back bends (complementing the side to side bends) to create a fully natural appearance, and also creating a "front" or viewing side. The skills involved in shaping a bonsai plant by eye and artistic judgment are not easily developed. The relative shortage of such skilled workers is a barrier to the large scale nursery cultivation of bonsai plants, and is a barrier to the wide-scale introduction of bonsai plants into the United States and other countries.

Applicant is aware of various plant support structures that serve generally to support or shape a plant. Examples of these include the devices described in U.S. Pat. No. 4,993,184 of Howe (heart-shaped free standing plants); U.S. Pat. No. 4,881,342 of Ferguson (vertical plant supports); U.S. Pat. No. 4,333,264 of Smrt (sic) (tree clip and post); U.S. Pat. No. 4,026,068 of Tepper (tomato plant support); U.S. Pat. No. 3,004,366 (plant support for holding a plant or vine in an upright position); and U.S. Pat. No. 2,557,731 of Felsing (multi-positionable trellis). Other such structures are shown in International Patent Application No. PCT/DK89/00039 (International Publication No. WO 89/07391) of Johansen, et al. (plant supporting stake with retaining fingers); Soviet Union Patent No. SU-632,325 of Mukhin et al. (bending fruit trees into a "living hedge" shape); and French Patent No. FR-680.147 (vertical plant support).

None of the foregoing examples shows or suggests an apparatus that is suitable for the special problems of bonsai plant training, and none of the foregoing examples shows or suggests a method of plant training that is suitable for bonsai training.

The desired bonsai plant training method should reduce the time and labor involved, both in setting the desired bends in the first place, and in checking and rechecking the plants to prevent scarring. The desired bonsai plant training method should open the field to persons who are not highly skilled artisans by permitting them to set a series of zigzag bends, including bends from front to back and bends from side to side so as to create the aesthetically approved appearance without special skill. The desired method should rely upon a readily produced apparatus that greatly simplifies the work of bonsai plant training.

It is a specific object of the method and apparatus of this invention to provide a method and apparatus for bonsai plant training that is suitable for large scale nursery production of aesthetically pleasing bonsai plants with substantial savings in time and labor costs, and that can open the field to persons who are not skilled artisans.

SUMMARY OF THE INVENTION

This invention uses a training apparatus, shaped like a ladder and having pegs and/or hooks at the bend points desirable for a bonsai plant. The training apparatus is placed next to the plant to be trained, and then the plant is bent around selected pegs or hooks as it placed upon the ladder.

The plant is readily bent into an aesthetic bonsai shape because the appropriate bends can be determined by reference to the training apparatus (permitting anyone to make the bends, regardless of their skill and experience). Further, it is impossible for an unattended plant to grow into the pegs (thereby avoiding the scarring that can ruin an unattended plant prepared under the traditional method, and substantially reducing the amount of monitoring, loosening, rewrapping and checking otherwise involved). After the growing season, or when the plant will stand as bent, the training ladder is removed, leaving a standardized bonsai starting plant that may then be sold to nurseries, artisans, hobbyists, or customers.

It is an object of this invention to replace the skilled artisan with a training apparatus and method that enables anyone to do the work, and which eliminates the need to monitor the growing plants to prevent scarring. The advantages of this invention include the ability to create bonsai training plants on a large scale with substantially reduced labor costs and with fewer ruined plants.

In summary, this invention includes a ladder-like training structure having pegs and/or hooks for supporting the plant. The trainer is placed next to a plant that is to be trained and the plant is arranged on the pegs or hooks, establishing the characteristic zigzag shape that is desired in a bonsai plant. The stem will not grow into the pegs of the apparatus of this invention and, thus, the need for checking and rechecking the plants to avoid scarring is greatly diminished. Further, the provision of the ladder-like training structure greatly simplifies the selection of the bend points and greatly speeds the positioning of the plant in an aesthetically pleasing system of bends.

According to the method and apparatus of this invention, bonsai plants may be readily produced on a large scale in commercial nurseries without the time and specialized labor costs involved in the traditional bonsai training method. These and other advantages of the bonsai training system of this invention will become apparent in the remainder of this disclosure.

DESCRIPTION OF THE DRAWINGS

FIG. 1 is a front perspective view of a bonsai training apparatus according to this invention, and showing straight posts.

FIG. 2 is a side perspective view of a bonsai training apparatus according to this invention, and showing zigzag-shaped posts.

DETAILED DESCRIPTION OF THE INVENTION

Figure 3:
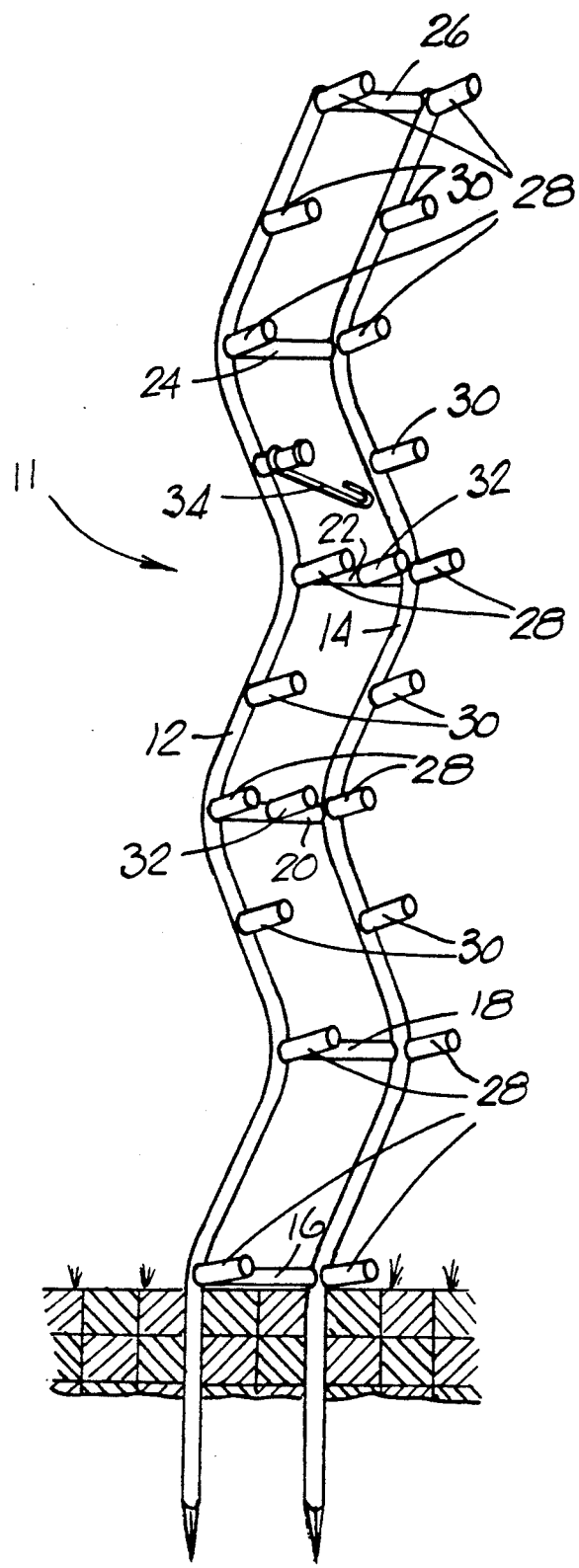
FIG. 3 is a side perspective view of a bonsai training apparatus according to this invention, and showing "S"-shaped posts.

With reference to FIG. 1, it may be seen that the apparatus of this invention includes a ladder-like training structure 10, defined by a pair of vertical poles 12, 14 and a number of horizontal rungs 16, 18, 20, 22, 24, 26. A number of pegs 28, 30, 32 protrude from the poles and rungs.

As illustrated, the vertical poles of the training structure 10 include a left pole 12 and a right pole 14. Six horizontal rungs are illustrated, including a first rung 16, a second rung 18, a third rung 20, a fourth rung 22, a fifth rung 24, and a sixth rung 26.

The pegs are variably spaced about the training structure 10. The pattern includes the placement of corner pegs 28 at each of the places where one of the horizontal rungs (16, 18, 20, 22, 24, 26) intersects with a vertical pole (12 and 14). Thus it may be seen in the apparatus as illustrated that there are a total of twelve corner pegs 28.

The twelve corner pegs are disposed in sets of four as follows:

The first set of four corner pegs 28 is disposed, one at each of the corners of the quadrilateral formed by the first rung 16, the second rung 18, and the two vertical poles;

the second set of four corner pegs 28 is disposed, one at each of the corners of the next higher quadrilateral formed by the third rung 20, the fourth rung 22, and the two vertical poles; and the third set of four corner pegs 28 is disposed, one at each of the corners of the highest quadrilateral formed by the fifth rung 24, the sixth rung 26, and the two vertical poles.

In addition to the twelve corner pegs 28, the pattern includes eight vertical spacing pegs 30 and two horizontal spacing pegs 32. The vertical spacing pegs 30 are on the left pole 12 and right pole 14 of the ladder 10; the horizontal spacing pegs 32 are on the horizontal rungs of the ladder.

As illustrated, the eight vertical spacing pegs 30 are arranged in four pairs of two. There are four vertical spacing pegs 30 on the left pole 12 of the ladder, and four vertical spacing pegs 30 on the right pole 14 of the ladder.

The eight vertical spacing pegs are disposed as follows:

the first set of two pegs includes one vertical spacing peg 30 between the second rung 18 and the third rung 20 on the left post 12, and another vertical spacing peg 30 between the second and third rung on the right post 14, nearly opposite the peg on the left post, the second set of two pegs includes one vertical spacing peg 30 between the third rung 20 and the fourth rung 22 on the left post 12, and another vertical spacing peg 30 between the third and fourth rung on the right post 14, nearly opposite the peg on the left post, the third set of two pegs includes one vertical spacing peg 30 between the fourth rung 22 and the fifth rung 24 on the left post 12, and another vertical spacing peg 30 between the fourth and fifth rung on the right post 14, nearly opposite the peg on the left post, and the fourth set of two pegs includes one vertical spacing peg 30 between the fifth rung 24 and the sixth rung 26 on the left post 12, and another vertical spacing peg 30 between the fifth and sixth rung on the right post 14, nearly opposite the peg on the left post.

The last pegs to be discussed are the two horizontal spacing pegs 32. These pegs are on the horizontal rungs of the ladder 10. As illustrated, there is a horizontal spacing peg 32 between the corner pegs 28 on the third rung 20 of the ladder, and there is a horizontal spacing peg 32 between the corner pegs 28 on the fourth rung 22 of the ladder.

It may be understood that the pegs 28, 30, 32 protrude at approximately 90 degrees from the poles and rungs of the ladder 10. These pegs can be supplemented with one or more hooks 34 (in FIG. 1, one hook is shown on the vertical spacing peg between the fourth rung 22 and the fifth rung 24 of the ladder 10) which, as an option, can create movable protrusions that could be made to slide up or down the poles. The effect of a movable protrusion is created by allowing the hook 34 to be rotatably anchored, at the base end thereof, to a selected peg. This allows the hooked end of hook 34 to rotate about the radius of an arc defined by the peg as the center point. The hooked end can therefore be seen to create the effect of a movable protrusion with relation to any selected peg.

The training ladder 10, including the vertical posts, horizontal rungs and pegs, may be made of plastic, metal, or wood. In a preferred embodiment, a metal wire is used. In a preferred embodiment, the pegs are enlarged at the tips to keep a tree trunk in place. The pegs may be covered by a pliable material, such as rubber, or may be left uncovered. The hooks 34 may be made from various sizes of wire. For a variety of plants, the following specific dimensions have been found to be suitable:

Vertical posts 12 and 14: approximately 9 to 10 inches in length,

Horizontal rungs 16, 18, 20, 22, 24 and 26: approximately 1 inch in length,

Pegs 28, 30 and 32: approximately three-sixteenths of an inch in length, and

Distance between the horizontal rungs: approximately 1 and one-half inches.

It should be understood, however, that a training ladder produced according to this invention may be scaled to any dimension suitable to the plant that is going to be trained (that is, between 2 inches and about 4 feet in height), and that the training ladder is not limited to the dimensions of the example just given.

Referring to FIG. 2, which shows a side view of a training ladder 11 that is like the ladder 10 just discussed (and having vertical posts 12 and 14; horizontal rungs 16, 18, 20, 22, 24 and 26; pegs 28, 30 and 32; and hooks 34, all numbered with reference numbers corresponding to those discussed in connection with ladder 10 of FIG. 1), it may be understood that the ladder 11 may have a third dimension. In FIG. 2, ladder 11 is shown having a zigzag shape from front to back so as to impart a third dimension. It should also be understood that an "S" shape, or even a series of irregular bends, could also have been used—what is desired is simply a ladder that includes a series of bends to the vertical posts 12 and 14 to add the additional dimension. See FIG. 3.

In a preferred embodiment, the ladder is made of a flexible metal wire so that it may be bent. The ladder may be pre-formed in the front to back zigzag or "S" shape or FIGS. 2 or 3, or it may be formed straight. In the former case, the ladder will be made of pre cut wood posts, or molded plastic or metal posts, formed into the desired "S" shape; in the later case, the posts of the ladder would be made of a flexible material, and the user could bend the posts to set the zigzag or "S" shape in the third dimension.

The method of using the training ladder of this invention is as follows:

A plant is selected and a main branch (referred to as the "number one branch") is identified—this is usually the largest branch and is the branch closest to the bottom of the plant. The plant is turned until the number one branch is on the right side. The bottom points of the vertical posts 12, 14 of the training ladder 10 are inserted down into the soil at the right side of the plant until the first rung 16 is at the level of the soil and the corner peg 28 at the intersection of the first rung and the left post 12 is against the base of the trunk of the plant. The plant is then bent generally according to this example:

Using the corner peg 28 of the first rung and left post as a fulcrum, the plant is bent carefully to the corner peg 28 at the intersection of the second rung 18 and the right post 14;

using the corner peg 28 of the second rung and right post as a fulcrum, the plant is bent carefully to the horizontal spacing peg 32 on the third rung 20;

using the horizontal spacing peg 32 of the third rung as a fulcrum, the plant is bent carefully to the corner peg 28 at the intersection of the fourth rung 22 and the right post 14;

using the corner peg 28 of the fourth rung 22 and right post 14 as a fulcrum, the plant is slightly bent (by passing it around the vertical spacing peg 30 between the fourth rung 22 and the fifth rung 24) and directed upwards to the corner post 28 at the intersection of the fifth rung 24 and the right post 14;

using the corner peg 28 of the fifth rung 24 and right post 14 as a fulcrum, the plant is slightly bent (by passing it around the vertical spacing peg 30 between the fifth rung 24 and the sixth rung 26) and directed upwards to the corner post 28 at the intersection of the sixth rung 26 and the right post 14; and if the ladder is not pre-formed in a third-dimensional zigzag or "S" shape from front to back, the ladder is bent into an "S" shape toward the front before applying the training ladder to the tree.

The foregoing is just one example of how the bonsai training of this invention may be accomplished. From this example, a person skilled in the art will be readily able to create the variations appropriate to create any number of other effects. When completed, the young tree in training should have large bends at the base and progressively smaller bends as it gets to the top. Branches are allowed to grow through the rungs, and oriented so that primary branches are on the outer bends of the trunk. If the pegs are not at the right location for proper branch placement, one or more of the hooks 34 should be used to provide the necessary placement points. The training ladder should be left on the tree for one growing season, and may be removed at any time after the trunk is able to hold its shape without the ladder.

It should now be understood that the use of the training ladder requires no special artistic skills. Compared to conventional bonsai plant training methods, it is fast and easy to install and to remove. It will not cause wire scarring on tree trunks. Because the training ladder can be reused many times, the cost of materials should be recoverable by the user.

From the foregoing example, it should be apparent to those knowledgeable in the art that the training ladder can be made from extruded plastics, metal wire, rods or pipes, wood or any rigid material strong enough to bend a plant into an artistic shape. Plastics may be molded into the ladder shape; "U" shaped metal wire, rods or pipes may be welded together or otherwise fabricated into the ladder shape; wood may be sawed into a pair of "S" curved, zigzag, or otherwise "bent" vertical posts and joined together into the ladder shape. The length of the ladder will vary, in a manner readily determined by those familiar with the art, with the height of the tree to be trained; the width of the ladder will vary with the angle of the bend desired; and the placement of horizontal spacing pegs, vertical spacing pegs, and adjusting hooks will vary with the size of the plant, the angle of the bend desired, and the artistic effect to be created.

The method and apparatus of this invention, using a bonsai training ladder with fixed pegs and movable hooks, creates artistic three-dimensional bends on plants used for bonsai. The training ladder can be used by any bonsai training enthusiast, from the untrained beginner to the expert. Because the training ladder gives uniform results, and substantially reduces the time and labor involved in setting the trees in the first place and in monitoring and checking the trees, and in removing the apparatus, it is especially useful in commercial and large scale nursery operations. Used in a country such as the United States in which skilled bonsai artisans are few, the method and apparatus of this invention can help to introduce the bonsai art to a much wider number of people than would otherwise be able to enjoy it.

What is claimed is:

1. A method for training a bonsai plant growing in soil, comprising the steps of:
   (a) placing a training ladder next to the plant, the training ladder having a left vertical post and a right vertical post, a plurality of horizontal rungs connected to the left vertical post and the right vertical post, and a plurality of fixed pegs protruding from the ladder,
   (b) inserting the vertical posts of the ladder into the soil until a horizontal rung of the ladder is at the level of the soil and a first fixed peg of the plurality of pegs is against the plant,
   (c) using the first fixed peg as a fulcrum, bending the plant until it is against a second fixed peg of the plurality of pegs,
   (d) using the second fixed peg as a fulcrum, bending the plant until it is against a third fixed peg of the plurality of pegs, and
   (e) removing the training ladder after the plant is able to hold its shape.

2. The method of claim 1, wherein the bending steps are done so that the plant has relatively large bends near the bottom and relatively small bends near the top.

3. The method of claim 2, wherein the plant has a stem and a plurality of branches growing off the stem, including a plurality of relatively large branches and a plurality of relatively small branches, and further comprising the step, in cooperation with each of said bending steps, of orienting the plant so that a relatively large branch is near the peg that is used as the fulcrum for bending.

4. The method of claim 3, wherein the training ladder has a plurality of movable hooks, each hook having a base end and a hooked end, the hooks being movably attached to the ladder at their base ends, and wherein the orienting and bending steps further comprise the step of selectively substituting a hook for a peg when the hooked end of the hook provides a fulcrum closer to said relatively large branch.

5. The method of claim 1, comprising the further step at any time prior to removing the ladder, of shaping the vertical posts of the ladder into a zigzag shape.

6. The method of claim 1, comprising the further step at any time prior to removing the ladder, of shaping the vertical posts of the ladder into an "S" shape.

7. A training ladder for a bonsai plant, comprising:
   (a) a rigid unitary left vertical post and a rigid unitary right vertical post,
   (b) a plurality of horizontal rungs connected to the left vertical post and the right vertical post,
   (c) a plurality of fixed pegs protruding from the ladder, and
   (d) a plurality of movable hooks protruding from the ladder.

8. The apparatus of claim 7, wherein the connections of the horizontal rungs to the left and right vertical posts define a plurality of corners, and wherein the fixed pegs include: a plurality of corner pegs, each corner peg located near a corner; a plurality of vertical spacing pegs, each vertical spacing peg located on a vertical pole between corner pegs; and a plurality of horizontal spacing pegs, each horizontal spacing peg located on a horizontal rung between corner pegs.

9. The apparatus of claim 8, wherein the corner pegs, vertical spacing pegs, and horizontal spacing pegs are disposed on the training ladder so that a bonsai plant having a stem and a plurality of branches, including a plurality of relatively large branches and a plurality of relatively small branches, may be bent about said pegs, with the stem having relatively large bends at the bottom and relatively small bends near the top, and with relatively large branches at the pegs where the stem is bent.

10. The apparatus of claim 9, wherein the movable hooks are disposed in cooperation with said corner pegs, vertical spacing pegs, and horizontal spacing pegs on the training ladder so that a hook may be selectively substituted for such peg to facilitate the bending of said plant with relatively large branches at the hooks where the stem is bent.

11. The apparatus of claim 7, wherein the vertical posts are shaped in a zigzag shape.

12. The apparatus of claim 7, wherein the vertical posts are shaped in an "S" shape.

13. The apparatus of claim 7, wherein the vertical posts are flexibly deformable.

14. A training ladder for bonsai plant, comprising:
(a) a left vertical post and a right vertical post,
(b) a plurality of horizontal rungs connected to the left vertical post and the right vertical post,
(c) a plurality of fixed pegs protruding from the ladder, and
(d) a plurality of movable hooks protruding from the ladder, wherein the connections of the horizontal rungs to the left and right vertical posts define a plurality of corners, and wherein the fixed pegs include: a plurality of corner pegs, each corner peg located near a corner; a plurality of vertical spacing pegs, each vertical spacing peg located on a vertical pole between corner pegs; and a plurality of horizontal spacing pegs, each horizontal spacing peg located on a horizontal rung between corner pegs.

15. The apparatus of claim 14, wherein the corner pegs, vertical spacing pegs, and horizontal spacing pegs are disposed on the training ladder so that a bonsai plant having a stem and a plurality of branches, including a plurality of relatively large branches and a plurality of relatively small branches, may be bent about said pegs, with the stem having relatively large bends at the bottom and relatively small bends near the top, and with relatively large branches at the pegs where the stem is bent.

16. The apparatus of claim 15, wherein the movable hooks are disposed in cooperation with said corner pegs, vertical spacing pegs, and horizontal spacing pegs on the training ladder so that a hook may be selectively substituted for such peg to facilitate the bending of said plant with relatively large branches at the hooks where the stem is bent.

17. The apparatus of claim 14, wherein the vertical posts are shaped in a zigzag shape.

18. The apparatus of claim 14, wherein the vertical posts are shaped in an "S" shape.

* * * * *

UNITED STATES PATENT AND TRADEMARK OFFICE
CERTIFICATE OF CORRECTION

PATENT NO. : 5,252,072
DATED : October 12, 1993
INVENTOR(S) : Sasaki

It is certified that error appears in the above-indentified patent and that said Letters Patent is hereby corrected as shown below:

Column 6, line 14: Change "shape or Figs. 2 or 3" to
--shape of Figs. 2 or 3--.

Signed and Sealed this

Fifth Day of April, 1994

Attest:

BRUCE LEHMAN

Attesting Officer     Commissioner of Patents and Trademarks